(12) United States Patent
Saito

(10) Patent No.: US 9,761,196 B2
(45) Date of Patent: Sep. 12, 2017

(54) HEAD-MOUNT DISPLAY APPARATUS

(75) Inventor: Hitoshi Saito, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 194 days.

(21) Appl. No.: 13/604,303

(22) Filed: Sep. 5, 2012

(65) Prior Publication Data

US 2013/0076599 A1 Mar. 28, 2013

(30) Foreign Application Priority Data

Sep. 22, 2011 (JP) ................................ 2011-207220

(51) Int. Cl.
| | | |
|---|---|---|
| G09G 5/00 | (2006.01) | |
| G02B 27/01 | (2006.01) | |
| G06F 3/01 | (2006.01) | |
| G02B 27/00 | (2006.01) | |

(52) U.S. Cl.
CPC .............. *G09G 5/00* (2013.01); *G02B 27/017* (2013.01); *G06F 3/013* (2013.01); *G06F 3/017* (2013.01); *G02B 27/0093* (2013.01); *G02B 2027/014* (2013.01); *G02B 2027/0178* (2013.01); *G02B 2027/0187* (2013.01)

(58) Field of Classification Search
CPC .... G09G 5/00; G02B 27/017; G02B 27/0093; G02B 2027/0178; G02B 2027/0187; G02B 2027/014; G06F 3/002
USPC ....................................................... 345/7–9
See application file for complete search history.

(56) References Cited

U.S. PATENT DOCUMENTS

| | | | | |
|---|---|---|---|---|
| 5,742,264 | A * | 4/1998 | Inagaki ................ | G02B 27/017 345/7 |
| 6,061,064 | A * | 5/2000 | Reichlen ................ | G06F 3/011 345/418 |
| 6,757,068 | B2 * | 6/2004 | Foxlin .................. | G02B 27/017 356/139.03 |
| 2002/0140667 | A1* | 10/2002 | Horiki ................... | G06F 1/1616 345/156 |
| 2006/0018027 | A1* | 1/2006 | Yamasaki ............ | G02B 27/017 359/631 |

(Continued)

FOREIGN PATENT DOCUMENTS

| | | |
|---|---|---|
| JP | A-9-179062 | 7/1997 |
| JP | 2004-078977 A | 3/2004 |
| JP | 2010-218405 A | 9/2010 |

*Primary Examiner* — Vinh Lam
(74) *Attorney, Agent, or Firm* — Oliff PLC

(57) ABSTRACT

A head-mount display apparatus includes a display element, a sight line direction detecting unit, an imaging unit, a sight line direction determining section that determines whether or not the line of sight is oriented downward based on a detection result from the sight line direction detecting unit, an operation determining section that determines whether or not the shape of a hand of the viewer shows a predetermined operation pattern based on a signal inputted from the imaging unit, and a display control section that controls display operation of the display element based on determination results from the sight line direction determining section and the operation determining section, and the display control section instructs the display element to display an operation object when it is determined that the line of sight is oriented downward and that the shape of the hand shows the predetermined operation pattern.

7 Claims, 8 Drawing Sheets

(56) References Cited

U.S. PATENT DOCUMENTS

| | | | | |
|---|---|---|---|---|
| 2006/0197832 | A1* | 9/2006 | Yamada | G02B 27/017 348/77 |
| 2010/0156836 | A1* | 6/2010 | Katayama | G01S 5/16 345/173 |
| 2010/0240988 | A1* | 9/2010 | Varga | G02B 27/017 600/425 |
| 2010/0315329 | A1* | 12/2010 | Previc | G06F 3/012 345/156 |
| 2011/0074658 | A1* | 3/2011 | Sato | G02B 27/0093 345/8 |
| 2011/0140994 | A1* | 6/2011 | Noma | G02B 27/017 345/8 |
| 2011/0319166 | A1* | 12/2011 | Bathiche | G02B 27/017 463/40 |
| 2012/0075168 | A1* | 3/2012 | Osterhout | G02B 27/017 345/8 |
| 2012/0105473 | A1* | 5/2012 | Bar-Zeev | G06T 7/70 345/633 |
| 2012/0154277 | A1* | 6/2012 | Bar-Zeev | G02B 27/017 345/158 |
| 2014/0176609 | A1* | 6/2014 | Gotoda | G02B 27/017 345/633 |

* cited by examiner

HEAD-MOUNT DISPLAY APPARATUS

BACKGROUND

1. Technical Field

The present invention relates to a head-mount display apparatus worn around the head of a viewer.

2. Related Art

There has been a proposed head-mount display apparatus that has a spectacle-like external appearance and allows a viewer to view an image formed by an LCD (liquid crystal display) or any other display element through an optical system (see JP-A-9-179062, for example).

The head-mount display apparatus described in JP-A-9-179062 includes a display and a head position detector attached to the display. The display includes a display element (such as LCD) and an optical system, and the head position detector detects the inclination of the head of the viewer. When detecting that the head of the viewer is inclined downward, the head-mount display apparatus displays a virtual keyboard (operation object) in the position of a hand of the viewer.

In the head-mount display apparatus described in JP-A-9-179062, however, the virtual keyboard is always displayed whenever the head of the viewer is oriented downward. In this case, when the viewer does not intend to operate the keyboard, the displayed keyboard disadvantageously bothers the viewer and gives the viewer discomfort.

SUMMARY

An advantage of some aspects of the invention is to provide a head-mount display apparatus that allows a viewer to use the apparatus in an improved manner.

A head-mount display apparatus according to an aspect of the invention includes a display element that outputs image light to display an image, a sight line direction detecting unit that detects the direction of a line of sight of a viewer, an imaging unit that captures an image of an area in the direction of the line of sight, a sight line direction determining section that determines whether or not the line of sight is oriented downward based on a detection result from the sight line direction detecting unit, an operation determining section that determines whether or not the shape of a hand of the viewer shows a predetermined operation pattern based on a signal inputted from the imaging unit, and a display control section that controls display operation of the display element based on determination results from the sight line direction determining section and the operation determining section, and the display control section instructs the display element to display an operation object when it is determined that the line of sight is oriented downward and that the shape of the hand shows the predetermined operation pattern.

The operation object used herein means an object displayed as an operation unit of the head-mount display apparatus.

In the aspect of the invention, the display control section instructs the display element to display an operation object when it is determined that the line of sight of the viewer is oriented downward and that the shape of a hand of the viewer shows a predetermined operation pattern.

In this case, when the line of sight of the viewer is oriented downward, but the hand of the viewer does not show the predetermined operation pattern, no operation object is displayed, whereby no operation object will be displayed when the viewer intends to operate no operation object and the apparatus can be used in an improved manner.

In the head-mount display apparatus according to the aspect of the invention, it is preferable that the sight line direction detecting unit is an acceleration sensor provided in the head-mount display apparatus.

In general, to detect the line of sight of the viewer itself, that is, to detect the direction in which the eyes of the viewer are oriented, the configuration of a detecting unit is disadvantageously complicated.

In contrast, in the above configuration according to the aspect of the invention, the sight line direction detecting unit is an acceleration sensor provided in the head-mount display apparatus, and the direction of the line of sight of the viewer is detected by detecting the inclination of the head of the viewer based on the acceleration acting on the acceleration sensor. Since the direction of the line of sight can be thus detected by using the acceleration sensor, which is a general, simple component, the head-mount display apparatus can be manufactured in an inexpensive manner and the size thereof can be reduced.

It is preferable that the head-mount display apparatus according to the aspect of the invention further includes a projection lens that projects the image light from the display element and a light guide unit that is fixed relative to the projection lens and guides the image light through the projection lens to a predetermined position, and an outside object image is viewable through the light guide unit.

In the above configuration according to the aspect of the invention, since the head-mount display apparatus is what is called a see-through type, which allows an outside object image to be viewed through the light guide plate, the head-mount display apparatus allows the viewer to view not only an image formed by the display element but also an outside object image. Since the viewer can therefore view the image formed by the display element and the outside object image at the same time, the viewer does not need to put off the head-mount display apparatus when the viewer wants to look at the outside object image, whereby the head-mount display apparatus can be used in an improved manner.

In the head-mount display apparatus according to the aspect of the invention, it is preferable that the display control section allows the operation object to be displayed in a lower position of a display area.

In the above configuration according to the aspect of the invention, since the display control section allows an operation object to be displayed in a lower position of a display area, the hand of the viewer will not block the display area when the viewer is operating the operation object even when the head-mount display apparatus is of see-through type, whereby the apparatus can be used in a further improved manner.

In the head-mount display apparatus according to the aspect of the invention, it is preferable that the display control section allows a cursor to be displayed in the position in a display area that corresponds to the position of the hand when it is determined that the line of sight is oriented downward and that the shape of the hand shows a first operation pattern.

In the above configuration according to the aspect of the invention, when it is determined that the line of sight is oriented downward and that the shape of the hand shows the first operation pattern, a cursor is displayed in the position in the display area that corresponds to the position of the hand, whereby the cursor allows the viewer to recognize a pointed position in the display area in a satisfactory manner, whereas preventing any object that the viewer does not intend to operate from being displayed.

In the head-mount display apparatus according to the aspect of the invention, it is preferable that the display control section carries out a process defined by an operation object in the position in a display area that corresponds to the position of the hand when it is determined that the line of sight is oriented downward and that the shape of the hand shows a second operation pattern.

In the above configuration according to the aspect of the invention, when it is determined that the shape of the hand shows the second operation pattern, a process defined by an operation object in the position in the display area that corresponds to the position of the hand is carried out, which prevents any process that the viewer does not intend to carry out from being carried out, whereby the apparatus can be used in a still further improved manner.

In the head-mount display apparatus according to the aspect of the invention, it is preferable that the operation determining section determines whether or not a period during which the shape of the hand of the viewer shows the second operation pattern is longer than or equal to a predetermined period, and the display control section carries out a process of moving the operation object in the position in the display area that corresponds to the position of the hand in such a way that the operation object follows the position of the hand when it is determined that the line of sight is oriented downward and that the period during which the shape of the hand shows the second operation pattern is longer than or equal to the predetermined period.

In the above configuration according to the aspect of the invention, since the operation object in the position in the display area that corresponds to the position of the hand is so moved that the operation object follows the position of the hand when it is determined that the period during which the shape of the hand shows the second operation pattern is longer than or equal to the predetermined period, the viewer only needs to move the position of the hand to readily move the operation object.

In the head-mount display apparatus according to the aspect of the invention, it is preferable that the display control section carries out a process of displaying a list of operation associated with the operation object in the position in a display area that corresponds to the position of the hand when it is determined that the line of sight is oriented downward and that the shape of the hand shows a third operation pattern.

In the above configuration according to the aspect of the invention, since a list of operation associated with the operation object in the position in the display area that corresponds to the position of the hand is displayed when it is determined that the shape of the hand shows the third operation pattern, the operation associated with the operation object can be displayed by only presenting the shape of the hand showing the third operation pattern. An operation menu associated with the operation object can thus be readily displayed, whereby the apparatus can be used in a further improved manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

1. Configuration of Head-Mount Display Apparatus

Figure 1:
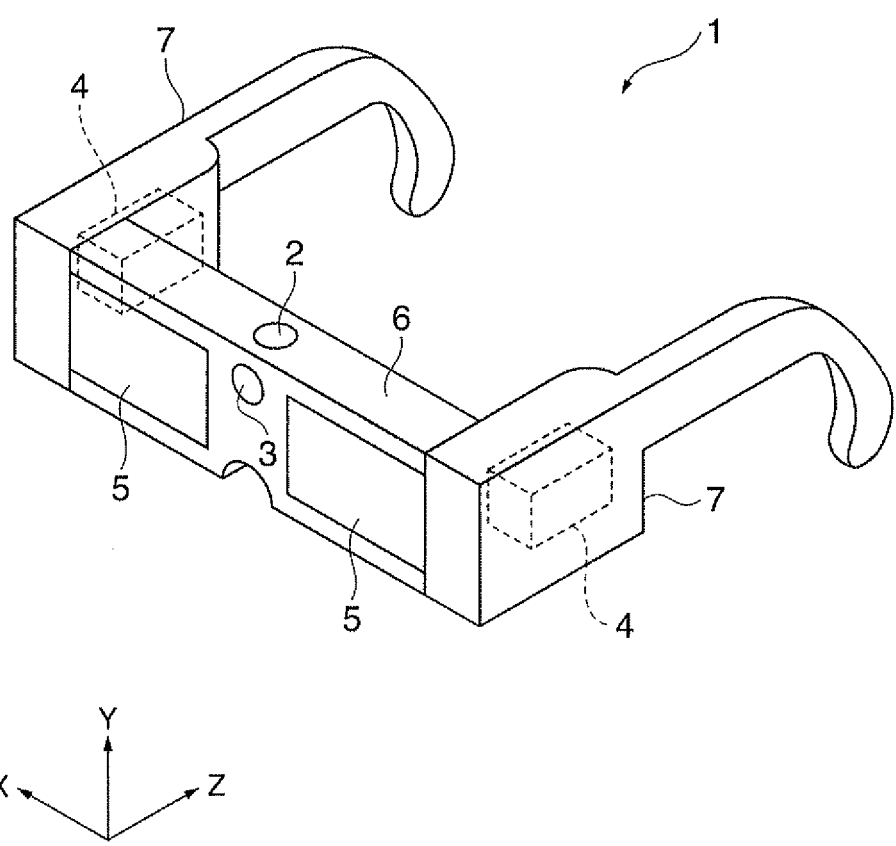
FIG. 1 is a perspective view showing an external appearance of a head-mount display apparatus in an embodiment of the invention.

FIG. 1 is a perspective view showing an external appearance of a head-mount display apparatus 1.

Figure 3:
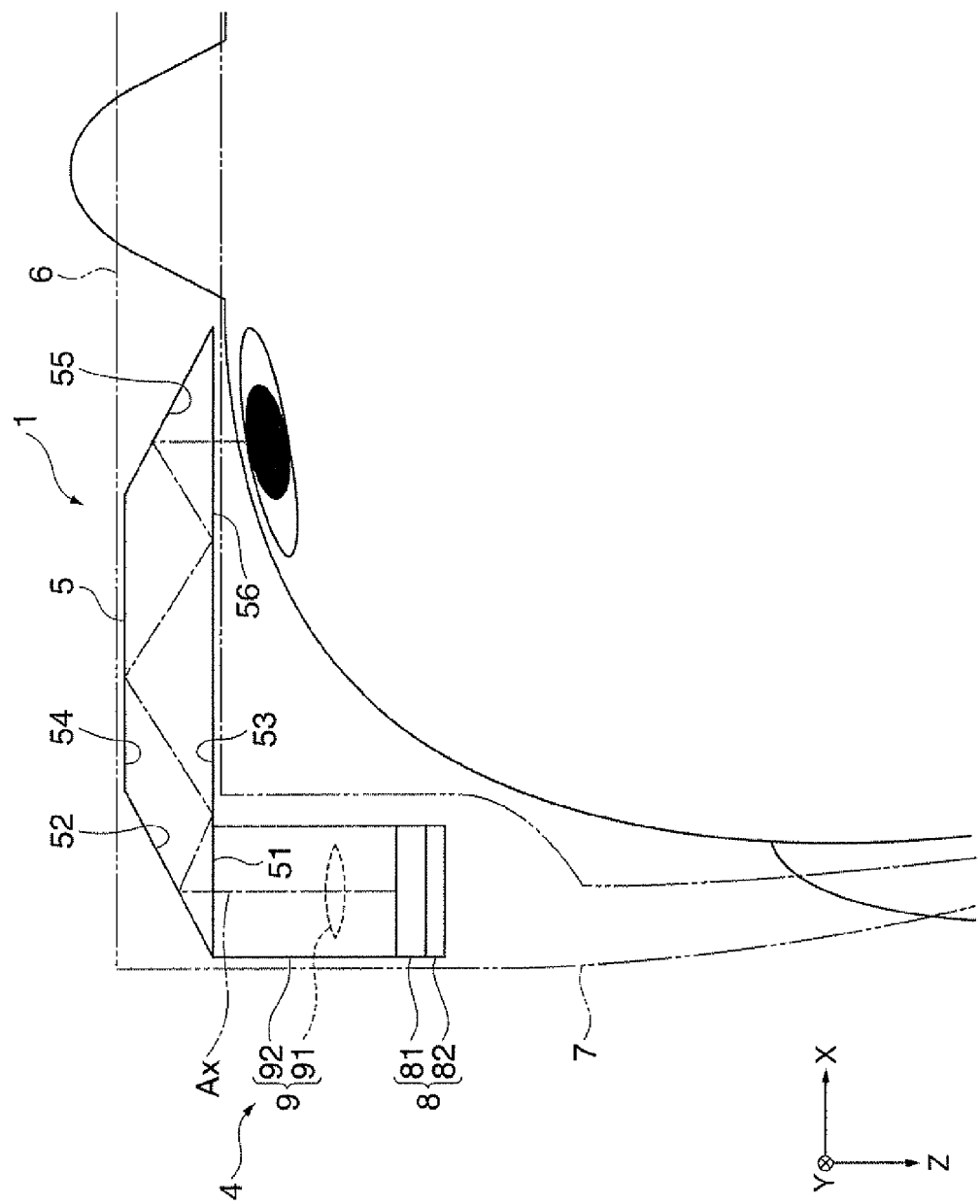
FIG. 3 shows the head-mount display apparatus when it is worn.

In FIG. 1, it is assumed for ease of description that an axis parallel to an optical axis Ax (FIG. 3) of a projection lens 91, which will be described later, is called a Z axis; a horizontal axis perpendicular to the Z axis is called an X axis; and a vertical axis perpendicular to the Z axis is called a Y axis. The same holds true for the following figures. Further, the Z axis has a +Z-axis side facing the viewer and a −Z-axis side facing away from the viewer. FIG. 3 shows only the side corresponding to the left eye of the viewer for ease of description.

The head-mount display apparatus 1 is a head-mount display having a spectacle-like external appearance as shown in FIG. 1 and allows the viewer who wears the head-mount display apparatus 1 to recognize image light. Further, the head-mount display apparatus 1 according to the present embodiment is configured to be a see-through virtual image display apparatus that allows the viewer to view an outside object image as a see-through image.

The head-mount display apparatus 1 includes a sight line direction detecting unit 2, an imaging unit 3, an image forming unit 4 (FIG. 2), a light guide plate 5 as a light guide unit, a rim 6 that holds the light guide plate 5, and a temple 7.

The sight line direction detecting unit 2 is provided in the rim 6 and detects the direction of the line of sight of the viewer.

In the present embodiment, the sight line direction detecting unit 2 is formed of an accelerator sensor (gravitation sensor) or a gyro sensor, which detects the inclination of the head-mount display apparatus 1 (inclination to horizontal direction) to detect the direction of the line of sight of the viewer and outputs a signal according to the detected inclination to a controller 10.

The imaging unit 3 is provided in the rim 6 and captures an image of an area located in the direction of the line of sight of the viewer.

In the present embodiment, the imaging unit 3 is disposed in a front central portion of the rim 6, captures an image of an area in front of the head-mount display apparatus 1, that is, an area located in the direction in which the head of the viewer faces to capture an image of an area located in the direction of the line of sight of the viewer. The imaging unit 3 is formed, for example, of a COD (charge coupled device)

camera including a CCD imaging device as an area sensor and outputs a signal according to a captured image to the controller 10.

The image forming unit 4, the light guide plate 5, and the temple 7 are paired with another set thereof in correspondence with the right and left eyes of the viewer who wears the head-mount display apparatus 1, as shown in FIG. 1, and the pairs of image forming units 4, light guide plates 5, and temples 7 are so disposed that they are symmetric with respect to the YZ plane (bilaterally symmetric).

The right and left pairs of image forming units 4, light guide plates 5, and temples 7 are configured in the same manner, and only the side corresponding to the left eye of the viewer will therefore be described below.

2. Configuration of Image Forming Unit

Figure 2:
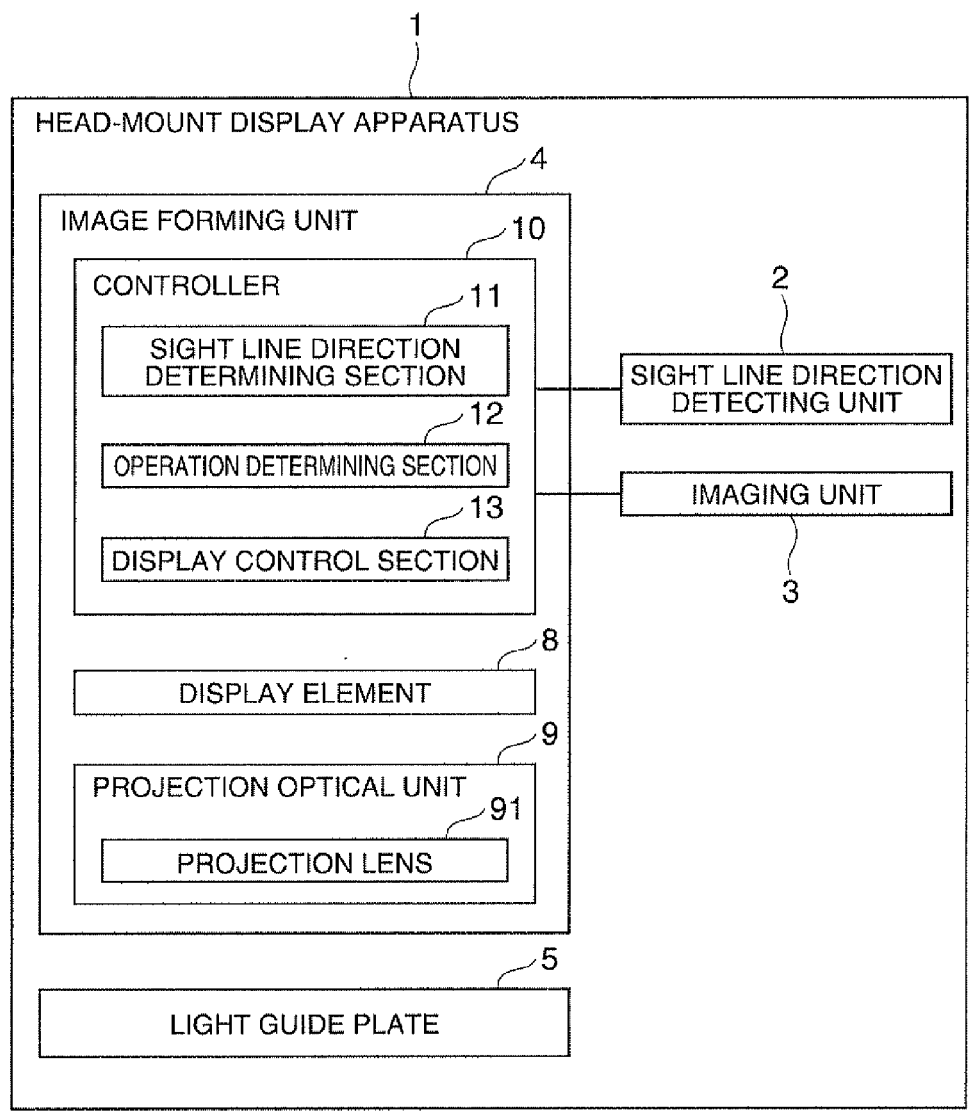
FIG. 2 is a block diagram showing the configuration of the head-mount display apparatus.

FIG. 2 is a block diagram showing the configuration of the head-mount display apparatus 1 including the image forming unit 4.

FIG. 3 shows the head-mount display apparatus 1 when it is worn.

The image forming unit 4 forms and projects image light and includes, as shown in FIGS. 2 and 3, a display element 8, a projection optical unit 9, and the controller 10 (FIG. 2).

The display element 8 outputs image light to display an image under display control of the controller 10. In the present embodiment, the display element 8 includes a transmissive liquid crystal display device 81, which modulates light incident thereon to form image light, and a backlight 82 (FIG. 3), such as an LED (light emitting diode), which is attached to the light-incident side of the liquid crystal display device 81 and outputs light toward the liquid crystal display device 81.

The projection optical unit 9 includes a projection lens 91, which projects the image light outputted from the display element 8 in the form of parallelized light, and a barrel 92 (FIG. 3), which accommodates the projection lens 91. The projection optical unit 9 is fixed to the rim 6, and the projection lens 91 is fixed to the light guide plate 5 via the barrel 92 and the rim 6. The thus configured projection lens 91 is not shifted relative to the light guide plate 5 (FIGS. 1 and 3).

The controller 10, which has a CPU (central processing unit), an IC (integrated circuit) chip, and other semiconductor devices mounted on a circuit substrate, drives the liquid crystal display device 81 based on an externally inputted image signal to have the liquid crystal display device 81 form image light based on the image signal.

The controller 10 includes a sight line direction determining section 11, an operation determining section 12, and a display control section 13, as shown in FIG. 2.

The sight line direction determining section 11 determines whether or not the line of sight of the viewer is oriented downward based on a signal inputted from the sight line direction detecting unit 2.

In the present embodiment, the sight line direction determining section 11 determines that the line of sight of the viewer is oriented downward when the inclination angle from the sight line direction detecting unit 2 is greater than a predetermined threshold.

The operation determining section 12 determines whether or not the shape of a hand of the viewer shows a predetermined operation pattern based on a signal inputted from the imaging unit 3.

Figure 4A:
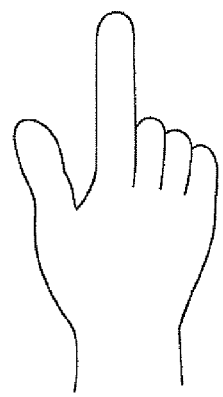
FIGS. 4A to 4C show shapes of a hand indicating operation patterns.

In the present embodiment, the operation determining section 12 recognizes that the viewer is doing predetermined operation when the shape of the hand of the viewer shows any of the shapes shown in FIGS. 4A to 4O.

FIG. 4A shows the shape of a hand indicating a pointing pattern as a first operation pattern by which the viewer points a location on a screen.

Figure 4B:
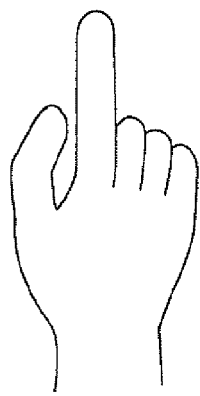

FIG. 4B shows the shape of a hand indicating a click pattern as a second operation pattern by which the viewer performs what is called mouse left click operation.

Figure 4C:

FIG. 4C shows the shape of a hand indicating a menu display pattern as a third operation pattern by which the viewer performs what is called mouse right click operation.

The image forming unit 4 includes a storage unit (not shown) that stores the operation patterns described above, and the operation determining section 12 recognizes based on the operation patterns stored in the storage unit that the viewer is doing predetermined operation. The operation patterns stored in the storage unit can be edited by using an operation pattern registering unit (not shown), and the viewer can set an arbitrary operation pattern.

The display control section 13 produces image data from an inputted image signal and outputs a drive signal to the display element 8 based on the image data to have the display element 8 display an image based on the image signal. Further, the display control section 13 instructs the display element 8 to display an operation object T (FIG. 8), such as a keyboard and an icon, or carries out a process defined by the operation object T based on determination results from the sight line direction determining section 11 and the operation determining section 12.

3. Configuration of Light Guide Plate

The light guide plate 5, which is made of a light-transmissive resin material or any other suitable material, receives image light outputted from the image forming unit 4 and then guides the image light to an external predetermined position (right or left eye of viewer). The light guide plate 5 has a substantially isosceles trapezoidal shape when viewed in the direction along the Y axis, as shown in FIG. 3. The light guide plate 5 has a light-incident surface 51, a first reflection surface 52, a first total reflection surface 53, a second total reflection surface 54, a second reflection surface 55, and a light-exiting surface 56.

The first reflection surface 52, which faces the light-incident surface 51 and is formed by depositing or otherwise forming an aluminum film on a flat surface inclined to the XY plane, reflects the image light introduced into the light guide plate 5 through the light-incident surface 51 toward the first total reflection surface 53.

The first total reflection surface 53 is formed of a flat surface that extends from the light-incident surface 51 (and parallel to the XY plane (perpendicular to the optical axis Ax)) and located on the +Z-axis side.

The second total reflection surface 54 is formed to be flat and parallel to the first total reflection surface 53 and located on the −Z-axis side.

The image light reflected off the first reflection surface 52 is totally reflected off the first and second total reflection surfaces 53, 54 and guided in the direction away from the light-incident surface 51 and the first reflection surface 52 (toward the other light guide plate 5).

Each of the first and second total reflection surfaces 53, 54 does not necessarily totally reflect image light off the interface with air without providing a mirror, a half-silvered mirror, or any other component on the surface but may reflect image light off a mirror coating or a half-silvered film formed on the entire or part of the first and second total reflection surfaces 53, 54. For example, provided that the angle of incidence of image light satisfies the total reflection condition, the entire or part of the first and second total reflection surfaces 53, 54 may, for example, have a mirror coating and reflect substantially the entire image light. Alternatively, when sufficiently intense image light is provided, the entire or part of the first and second total reflection surfaces 53, 54 may be coated with a mirror that is transmissive to some extent.

The second reflection surface 55, which faces the light-exiting surface 56 and is formed to be flat and inclined to the XY plane, reflects and guides the image light guided by the first and second total reflection surfaces 53, 54 through the light-exiting surface 56 to the external predetermined position (right or left eye of viewer). The second reflection surface 55, which is formed, for example, of a half-silvered mirror, can not only reflect image light but also transmit an outside object image.

The second reflection surface 55 is not necessarily formed, for example, of a half-silvered mirror but may be formed of a polarization beam splitter, a hologram diffraction grating, or any other component that has a function of guiding the image light guided by the first and second total reflection surfaces 53, 54 to an external predetermined position.

4. Configuration of Temple

The temple 7 is formed to be hollow, and the hollow portion accommodates the image forming unit 4, as shown in FIG. 3. In the present embodiment, the projection optical unit 9 and the display element 8 are sequentially disposed in tandem in the temple 7 in the direction from the side where the light guide plate 5 is present toward the tip of the temple 7.

The temple 7 rests on the ear of the viewer when the viewer wears the head-mount display apparatus 1.

5. Display Control

Display control performed by the head-mount display apparatus 1 described above will next be described with reference to the drawings.

Figure 5:
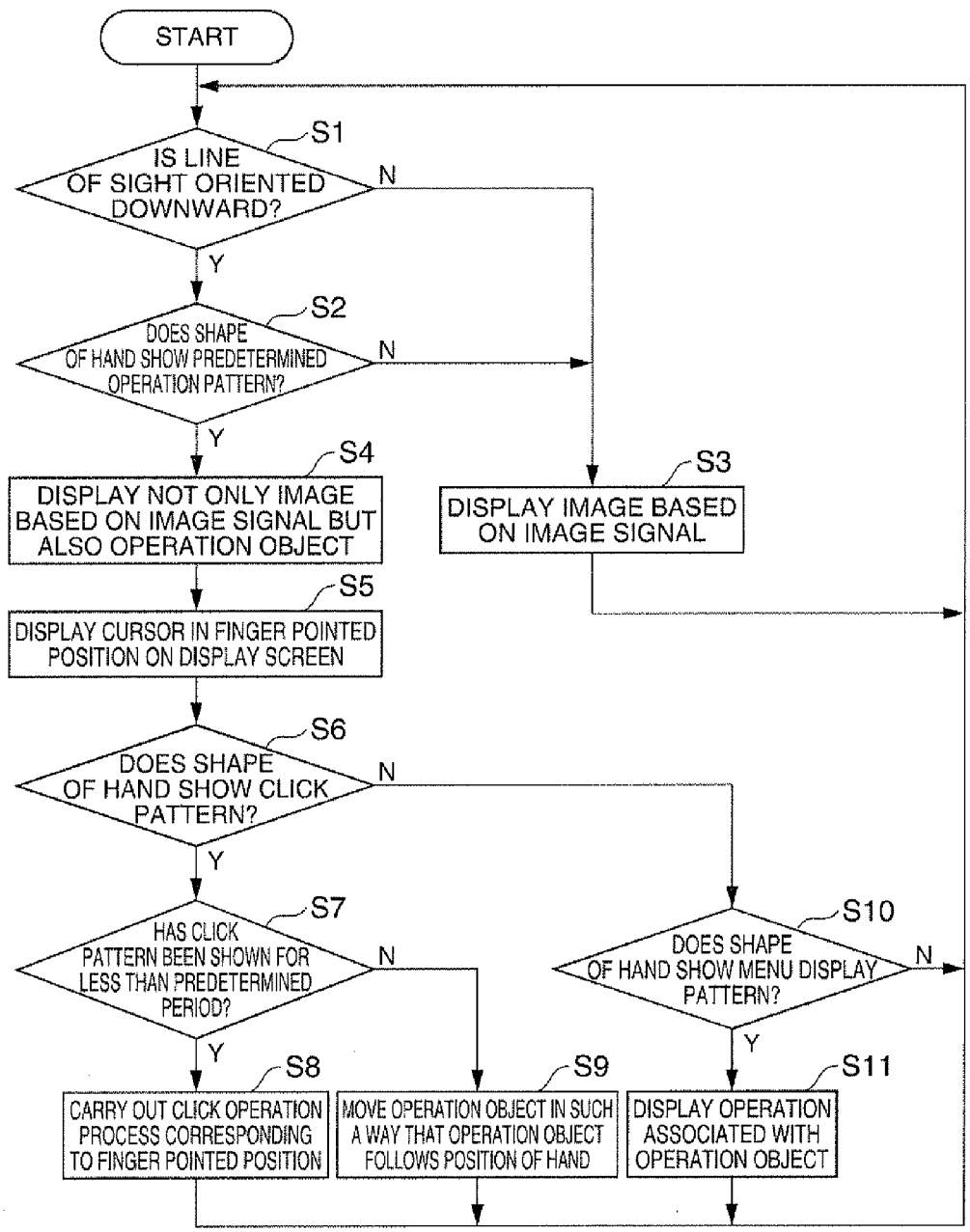
FIG. 5 is a flowchart for describing display control performed by the head-mount display apparatus.

FIG. 5 is a flowchart for describing the display control performed by the head-mount display apparatus 1.

Figure 6:
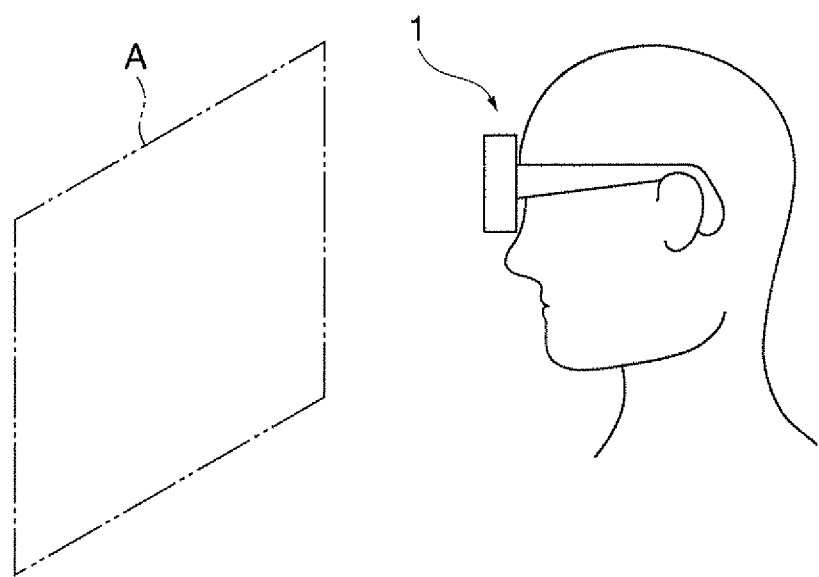
FIG. 6 shows how the head-mount display apparatus is used.
Figure 7:
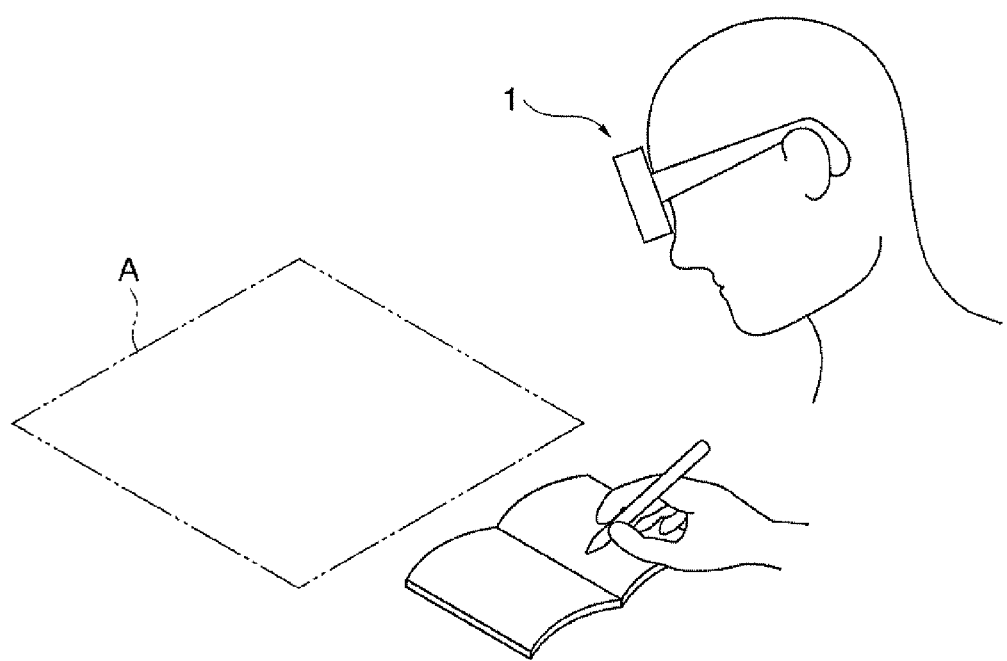
FIG. 7 shows how the head-mount display apparatus is used.
Figure 8:
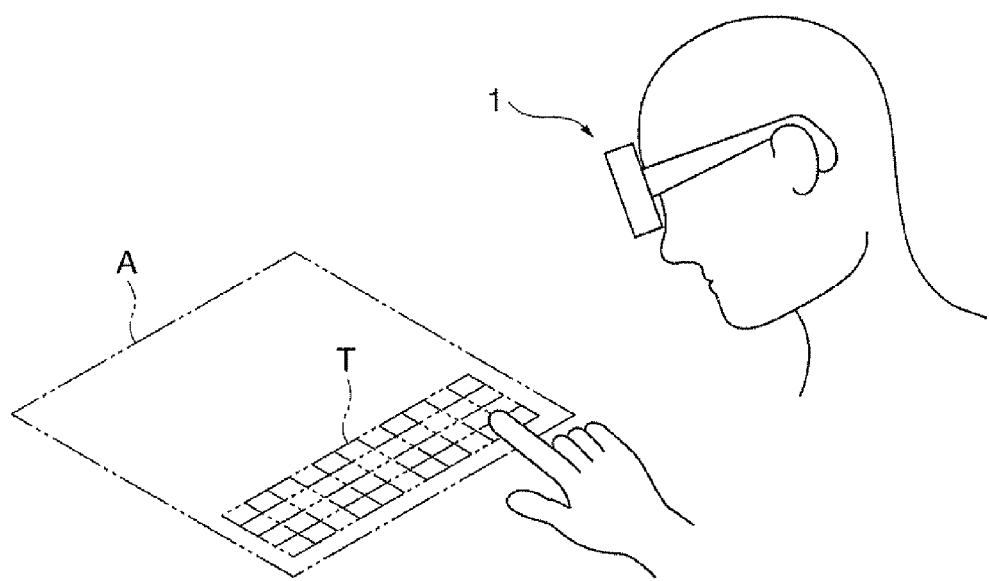
FIG. 8 shows how the head-mount display apparatus is used.

FIGS. 6 to 8 show how the head-mount display apparatus is used.

In FIG. 5, the sight line direction determining section 11 in the controller 10 first determines whether or not the head of the viewer is inclined downward to determine whether or not the line of sight of the viewer is oriented downward (step S1). When it has been determined in step S1 that the line of sight of the viewer is oriented downward, the operation determining section 12 determines what the viewer is doing based on the shape of a hand of the viewer (step S2).

When it has been determined in step S1 that the line of sight of the viewer is not oriented downward, the display control section 13 instructs the display element 8 to display an image based on an inputted image signal in a display area A (FIGS. 6 to 8) (step S3). In this case, the viewer is viewing the image with the head of the viewer horizontal, as shown in FIG. 6, and no operation object T, such as a keyboard, is displayed.

When it has been determined in step S1 that the line of sight of the viewer is oriented downward but it has been recognized in step S2 that the shape of the hand of the viewer does not show a predetermined operation pattern (any of the operation patterns shown in FIGS. 4A to 4C in the present embodiment), the display control section 13 instructs the display element 8 to display the image based on the inputted image signal in the display area A (step S3) as well. In this case, the viewer is viewing the image with the line of sight oriented downward, but no operation object T is displayed, as shown in FIG. 7. Since the head-mount display apparatus 1 according to the present embodiment is of see-through type, the viewer can, for example, take a note on a sheet while viewing the image.

On the other hand, when it has been determined in step S2 that the shape of the hand of the viewer shows the predetermined operation pattern, the display control section 13 instructs the display element 8 to display not only the image based on the inputted image signal in the display area A but also an operation object T in a lower position of the display area A (step S4), as shown in FIG. 8. Further, the operation determining section 12 determines the position of the hand of the viewer (position that a finger of the viewer is pointing in the present embodiment) based on a signal inputted from the imaging unit 3, and the display control section 13 instructs the display element 8 to display a cursor having an arrow shape or any other suitable shape in the position in the display area A that corresponds to the determined position (step S5).

Examples of the operation object T displayed in the display area A include a keyboard having character keys and other operation keys (keys for a variety types of operation, such as return (enter), forward, backward, input, delete, copy, and character conversion) and a variety of icons. When a keyboard is displayed, an input display field that displays a character inputted through the keyboard may also be displayed along with the keyboard, and when the return key is clicked after the character is inputted, the character displayed in the input display field may be inputted to a character input area in a document of a variety of applications or an Internet search site displayed in the display area A.

Subsequently, the operation determining section 12 determines whether or not the shape of the hand of the viewer shows the click pattern shown in FIG. 4B (step S6).

When it has been determined in step S6 that the shape of the hand of the viewer shows the click pattern, the operation determining section 12 determines whether or not the period during which the shape of the hand of the viewer shows the click pattern is longer than or equal to a predetermined period (step S7).

When it has been determined in step S7 that the period during which the click pattern is shown is shorter than the predetermined period, the display control section 13 carries out a process defined by the operation object T (FIG. 8) in the position corresponding to the position that the finger of the viewer is pointing (step S8). That is, the display control section 13 carries out a process of pressing a mouse left click button, which corresponds to what is called left click operation, with the cursor positioned on the icon in the display area A. In contrast, when it has been determined in step S7 that the period during which the click pattern is shown is longer than or equal to the predetermined period, the display control section 13 carries out a process of moving the operation object in the position in the display area A that corresponds to the position of the hand in such a way that the operation object follows the position of the hand, which corresponds to what is called mouse drag operation (step S9).

On the other hand, when it has been determined in step S6 that the shape of the hand does not show the click pattern, the operation determining section 12 determines whether or not the shape of the hand shows the menu display pattern (step S10). When it has been determined in step S10 that the shape of the hand does not show the menu display pattern, the control returns to step S1, whereas when it has been determined that the shape of the hand does, the display control section 13 instructs the display element 8 to display a list of operation associated with the operation object in the position in the display area that corresponds to the position of the hand (step S11). That is, the display control section 13 carries out a process of pressing a mouse right click button, which corresponds to what is called right click operation, with the cursor positioned on the icon in the display area A.

The embodiment described above provides the following advantageous effects.

In the present embodiment, the display control section 13 instructs the display element 8 to display an operation object T when it is determined that the line of sight of the viewer is oriented downward and that the shape of a hand of the viewer shows a predetermined operation pattern.

In this case, when the line of sight of the viewer is oriented downward, but the hand of the viewer does not show the predetermined operation pattern, no operation object T is displayed, whereby no operation object T will be displayed when the viewer intends to operate no operation object T and the apparatus can be used in an improved manner.

In general, to detect the line of sight of the viewer itself, that is, to detect the direction in which the eyes of the viewer are oriented, the configuration of a detecting unit is disadvantageously complicated.

In contrast, in the present embodiment, the sight line direction detecting unit 2 is an acceleration sensor provided in the head-mount display apparatus 1, and the direction of the line of sight of the viewer is detected by detecting the inclination of the head of the viewer based on the acceleration acting on the acceleration sensor. Since the direction of the line of sight can be thus detected by using the acceleration sensor, which is a general, simple component, the head-mount display apparatus 1 can be manufactured in an inexpensive manner and the size thereof can be reduced.

In the present embodiment, since the head-mount display apparatus 1 is what is called a see-through type, which allows an outside object image to be viewed through the light guide plate 5, the head-mount display apparatus 1 allows the viewer to view not only an image formed by the display element 8 but also an outside object image. Since the viewer can therefore view the image formed by the display element 8 and the outside object image at the same time, the viewer does not need to put off the head-mount display apparatus 1 when the viewer wants to look at the outside object image, whereby the head-mount display apparatus 1 can be used in an improved manner.

In the present embodiment, since the display control section 13 allows an operation object T to be displayed in a lower position of the display area A, the hand of the viewer will not block the display area A when the viewer is operating the operation object T even in the see-through head-mount display apparatus 1, whereby the apparatus can be used in a further improved manner.

In the present embodiment, when it is determined that the line of sight is oriented downward and that the shape of the hand of the viewer shows a first operation pattern, a cursor is displayed in the position in the display area A that corresponds to the position of the hand, whereby the cursor allows the viewer to recognize the pointed position in the display area A in a satisfactory manner, whereas preventing any object that the viewer does not intend to operate from being displayed.

In the present embodiment, when it is determined that the shape of the hand of the viewer shows a second operation pattern, a process defined by an operation object T in the position in the display area A that corresponds to the position of the hand is carried out, which prevents any process that the viewer does not intend to carry out from being carried out, whereby the apparatus can be used in a still further improved manner.

The invention is not limited to the embodiment described above, and changes, improvements, and other modifications made to the extent that the advantage of the invention can be achieved fall within the scope of the invention.

In the embodiment described above, the head-mount display apparatus uses the display element 8 including the transmissive liquid crystal display device 81, but the display element 8 is not necessarily configured this way and may alternatively include any other suitable component, such as a reflective liquid crystal display device and a digital micromirror device. The display element 8 may still alternatively include a self-luminous display device, such as, an organic EL device.

In the embodiment described above, the head-mount display apparatus 1 is of virtual image display type, in which image light outputted from the display element 8 is recognized by the viewer via the light guide plate 5, but the head-mount display apparatus 1 is not necessarily configured this way and may alternatively be of direct display type, in which image light outputted from the display element 8 is directly recognized by the viewer. Further, the light guide unit is not limited to the light guide plate 5 and may alternatively be a mirror or any other suitable component.

In the embodiment described above, the sight line direction detecting unit 2 is configured to detect the direction of the line of sight of the viewer by detecting the inclination of the head-mount display apparatus 1, but the sight line direction detecting unit 2 is not necessarily configured this way. The sight line direction detecting unit 2 may be configured differently as long as the direction of the line of sight of the viewer can be detected. For example, the sight line direction detecting unit 2 may be configured to detect the line of sight of the viewer itself.

In the embodiment described above, the display control section 13 instructs the display element 8 to display an operation object T along with an image based on an image signal, but the display element 8 may alternatively display only an operation object T, for example, in a case where the viewer wants to display a menu with no image based on an image signal displayed.

In the embodiment described above, the pointing pattern, the click pattern, and the menu display pattern are used as the first to third operation patterns, but the first to third operation patterns are not limited thereto. The operation patterns can be set arbitrarily.

In the embodiment described above, when it has been determined that the click pattern is shown at least for a predetermined period, an operation object is so moved that it follows the position of the hand of the viewer, but the operation object is not necessarily moved this way. For example, another object or screen displayed in the display area A, such as a document of a variety of applications or an Internet search site, may be moved.

The invention can be used with a head-mount display apparatus, such as a head-mount display.

The entire disclosure of Japanese Patent Application No. 2011-207220, filed Sep. 22, 2011 is expressly incorporated by reference herein.

What is claimed is:

1. A head-mount display apparatus comprising:
a display that outputs image light to display an image;
a sensor that detects a direction of a line of sight of a viewer;

a camera that captures an image in front of the head mount display apparatus of an area in the direction of the line of sight;

a controller configured to act as:

a sight line direction determining section that determines whether or not the line of sight is oriented downward based on a detection result from the sensor;

an operation determining section that determines whether or not a shape of a hand of the viewer shows a predetermined operation pattern based on a signal inputted from the camera; and a display control section that controls display operation of the display based on determination results from the sensor and the operation determining section, wherein the display control section instructs the display to display an operation object when it is determined that the line of sight is oriented downward and that the shape of the hand shows the predetermined operation pattern, wherein the display control section carries out a process defined by the operation object in a position in a display area that corresponds to a position of the hand when it is determined that the line of sight is oriented downward and that the shape of the hand shows a second operation pattern, wherein the operation determining section determines whether or not a period during which the shape of the hand of the viewer shows the second operation pattern is longer than or equal to a predetermined period, and the display control section carries out a process of moving the operation object in the position in the display area that corresponds to the position of the hand in such a way that the operation object follows the position of the hand when it is determined that the line of sight is oriented downward and that the period during which the shape of the hand shows the second operation pattern is longer than or equal to the predetermined period.

2. The head-mount display apparatus according to claim 1,
wherein the sensor is an acceleration sensor provided in the head-mount display apparatus.

3. The head-mount display apparatus according to claim 1, further comprising:

a projection lens that projects the image light from the display ; and a light guide unit that is fixed relative to the projection lens and guides the image light through the projection lens to a predetermined position, wherein an outside object image is viewable through the light guide unit.

4. The head-mount display apparatus according to claim 3,
wherein the display control section allows the operation object to be displayed in a lower position of a display area.

5. The head-mount display apparatus according to claim 1,
wherein the display control section allows a cursor to be displayed in the position in the display area that corresponds to the position of the hand when it is determined that the line of sight is oriented downward and that the shape of the hand shows a first operation pattern.

6. The head-mount display apparatus according to claim 1,
wherein the display control section carries out a process of displaying a list of operation associated with the operation object in the position in the display area that corresponds to the position of the hand when it is determined that the line of sight is oriented downward and that the shape of the hand shows a third operation pattern.

7. The head-mount display apparatus according to claim 1, wherein the operation determining section that determines whether or not the shape of the hand of the viewer shows a predetermined operation pattern based on a signal inputted from the camera and a comparison of the signal to a plurality of predetermined stored operation patterns.

* * * * *